United States Patent
Johnson et al.

(10) Patent No.: US 9,429,139 B2
(45) Date of Patent: Aug. 30, 2016

(54) TRANSPORTATION ASSEMBLY FOR ROTOR BLADE

(71) Applicant: General Electric Company, Schenectady, NY (US)

(72) Inventors: Stephen Bertram Johnson, Greenville, SC (US); Douglas C. Klein, Greenville, SC (US); Xianglei Chen, Simpsonville, SC (US); Srikanth Samudrala, Bangalore (IN)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 14/277,137

(22) Filed: May 14, 2014

(65) Prior Publication Data

US 2015/0329036 A1 Nov. 19, 2015

(51) Int. Cl.
*B60P 7/08* (2006.01)
*F03D 1/00* (2006.01)
*B60P 7/12* (2006.01)
*B60P 3/40* (2006.01)

(52) U.S. Cl.
CPC .............. *F03D 1/005* (2013.01); *B60P 7/0869* (2013.01); *B60P 7/12* (2013.01); *B60P 3/40* (2013.01); *F05B 2230/61* (2013.01); *F05B 2260/96* (2013.01); *Y02E 10/721* (2013.01); *Y02P 70/523* (2015.11)

(58) Field of Classification Search
CPC .......... B60P 7/12; B60P 7/0869; B60P 3/40; B60P 7/06; F03D 1/005
USPC .......... 410/39, 41, 44, 45, 97, 99, 120, 154, 410/155; 206/592; 294/74
See application file for complete search history.

(56) References Cited

U.S. PATENT DOCUMENTS

| | | | | |
|---|---|---|---|---|
| 3,941,412 | A * | 3/1976 | Carpenter | F16L 3/1226 294/74 |
| 5,415,449 | A * | 5/1995 | Kentner, Sr. | B66C 1/12 294/74 |
| 7,431,547 | B2 * | 10/2008 | Geary | B60P 7/0869 410/155 |
| 8,967,929 | B2 * | 3/2015 | Frederiksen | B60P 3/40 410/44 |
| 8,985,920 | B2 * | 3/2015 | Bitsch | 410/120 |
| 2005/0019166 | A1 * | 1/2005 | Bervang | F03D 1/001 |
| 2009/0169323 | A1 * | 7/2009 | Livingston | 410/120 |
| 2012/0025552 | A1 * | 2/2012 | Echarri Latasa | 294/67.31 |
| 2013/0119002 | A1 * | 5/2013 | Frederiksen | B60P 3/40 211/60.1 |

* cited by examiner

*Primary Examiner* — Stephen Gordon
(74) *Attorney, Agent, or Firm* — Dority & Manning, P.A.

(57) ABSTRACT

Transportation assemblies for rotor blades are provided. A transportation assembly includes a protection cap including a nose portion and a plurality of sidewall portions extending from the nose portion, the protection cap having a generally U-shaped cross-sectional profile. The transportation assembly further includes a restraint assembly including a first protrusion and a second protrusion each extending from the protection cap, the first protrusion and the second protrusion spaced apart along a width of the protection cap.

14 Claims, 8 Drawing Sheets

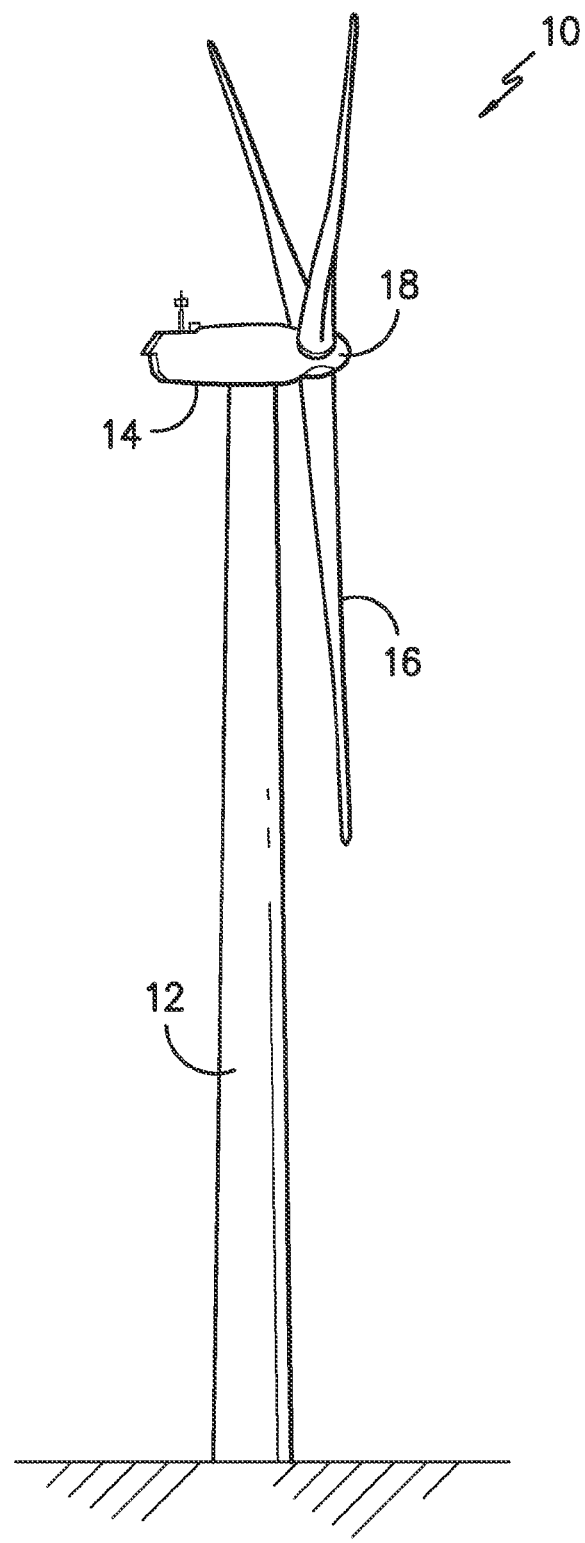
FIG. -1-

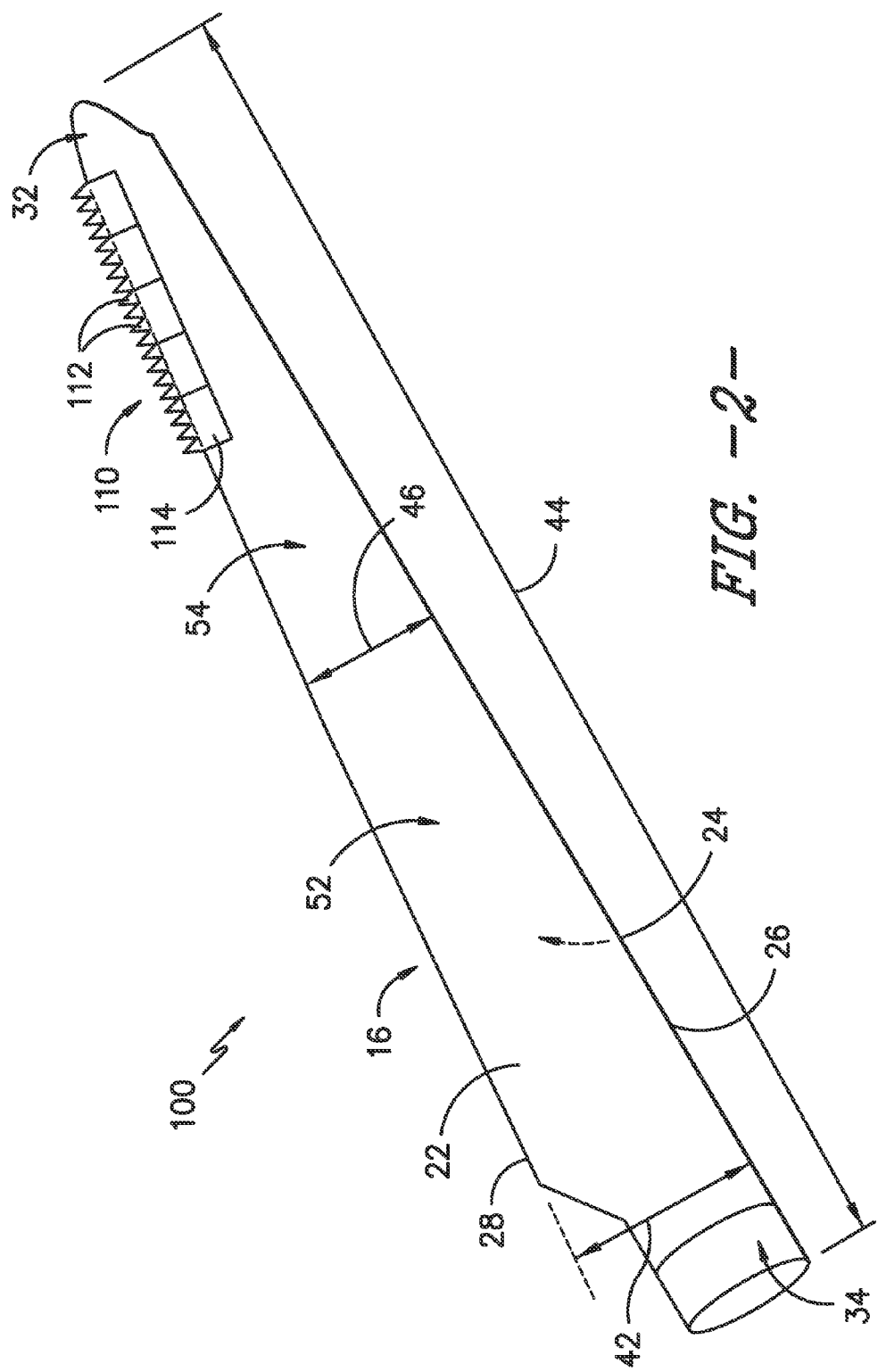

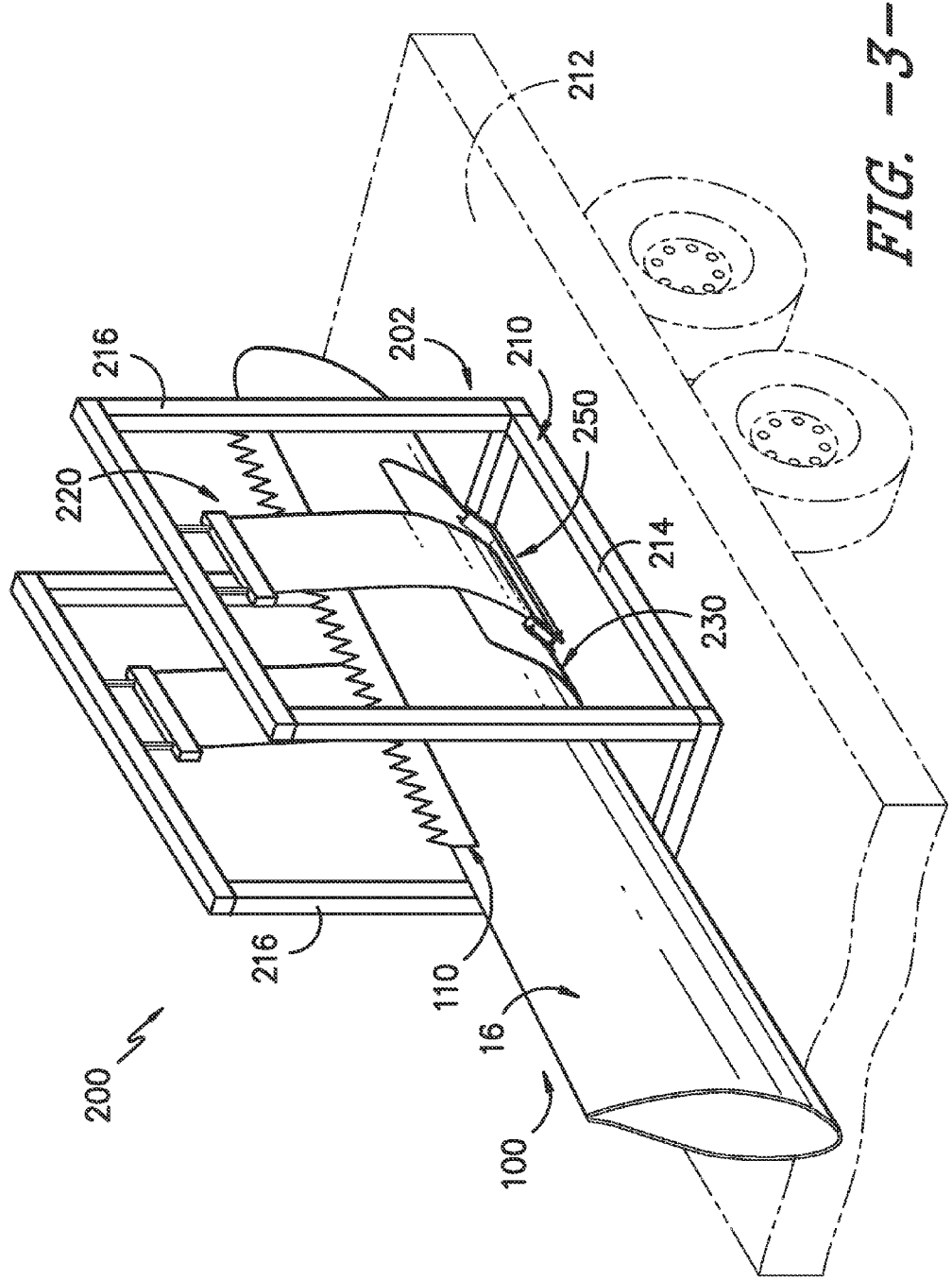
FIG. -3-

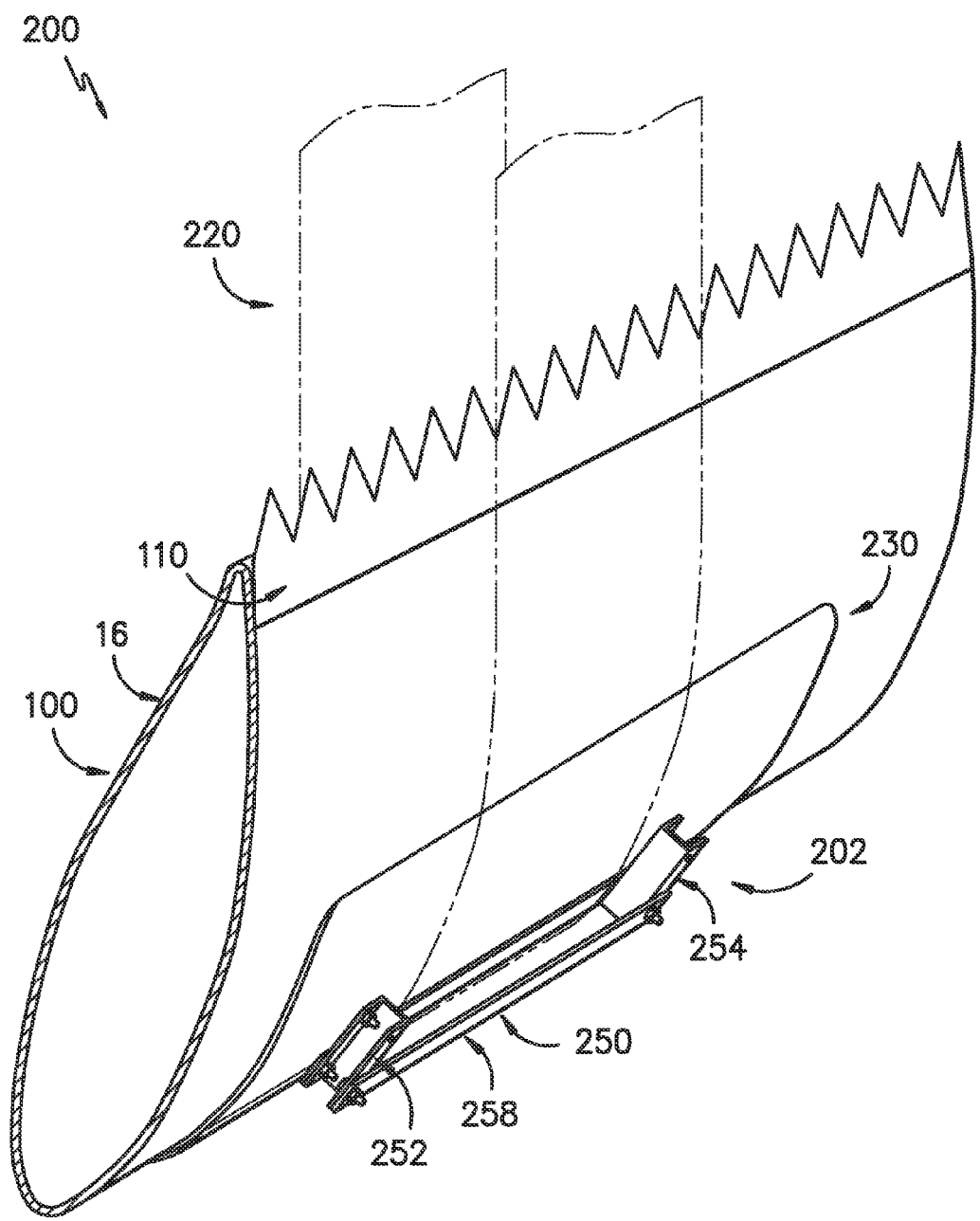
FIG. -4-

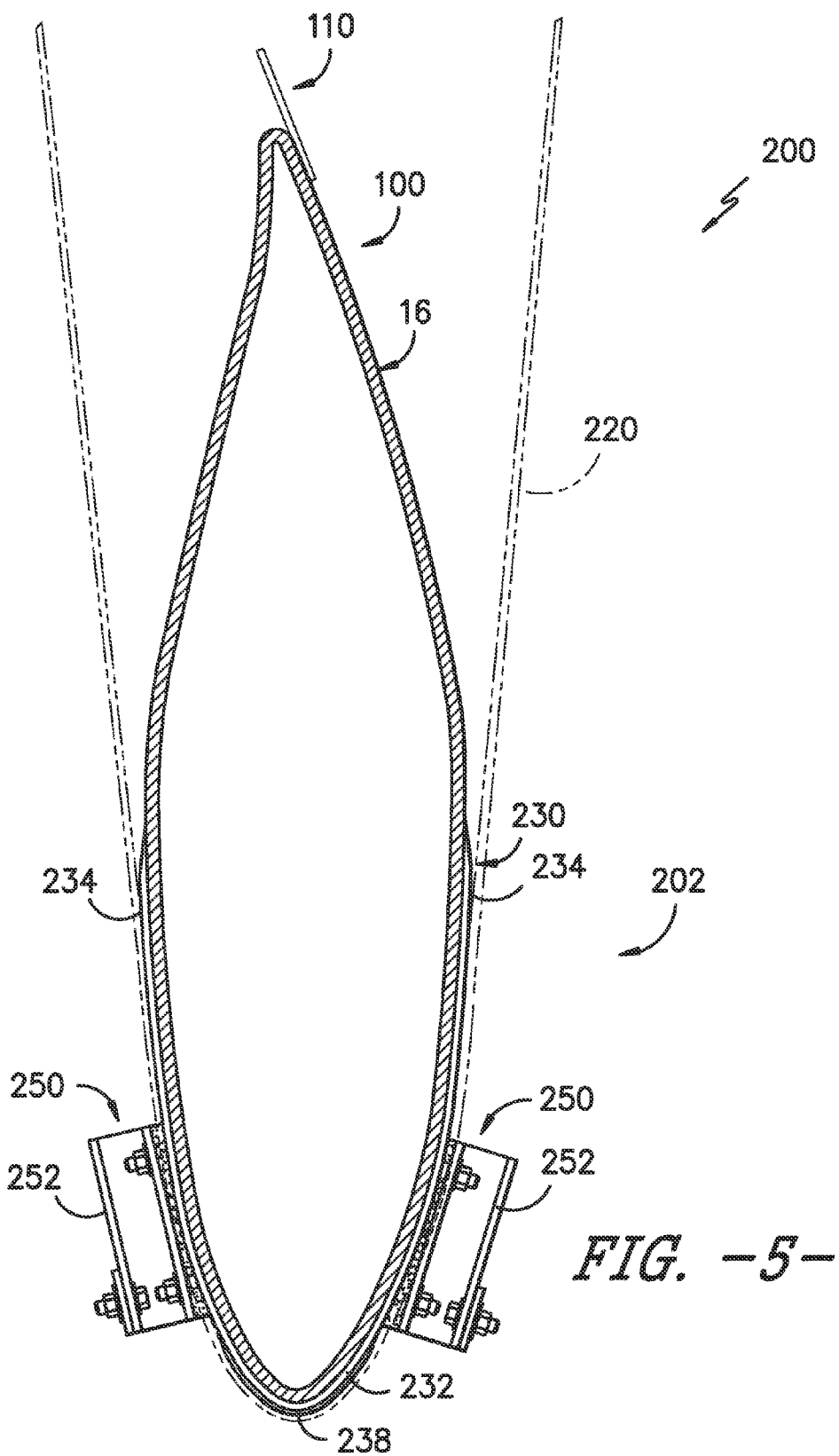
FIG. -5-

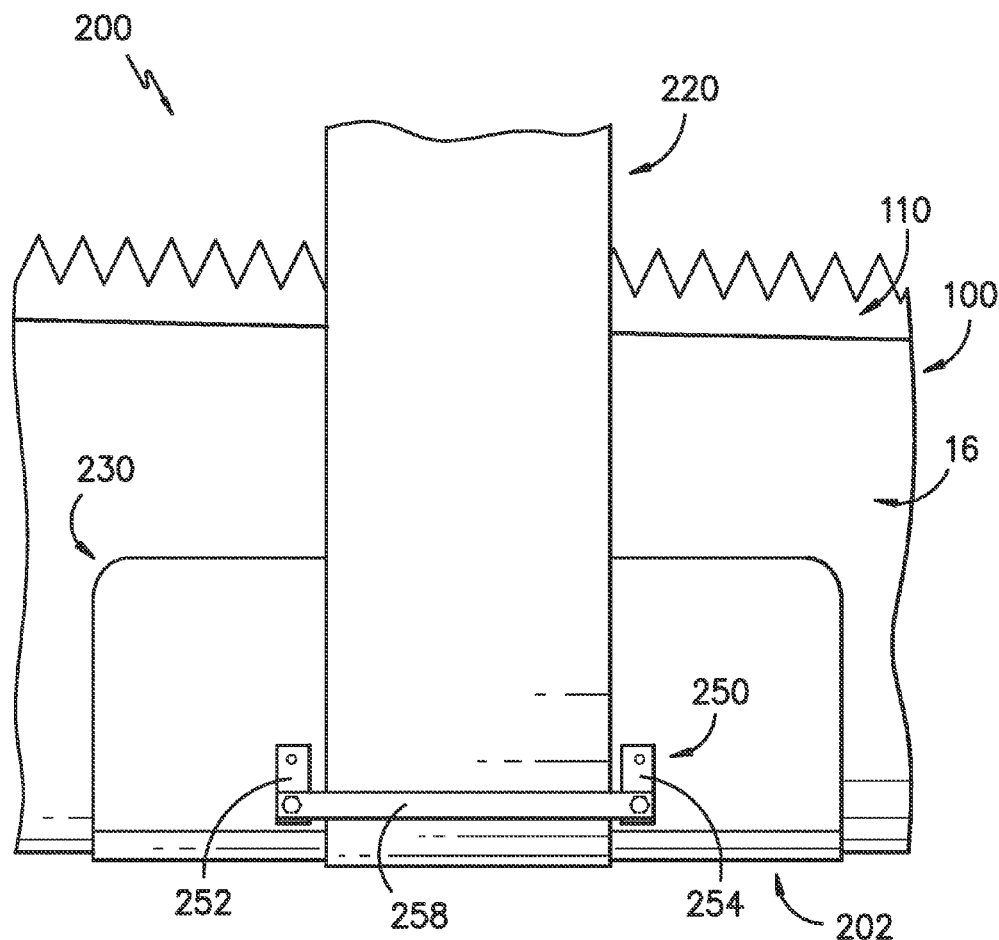
FIG. -6-

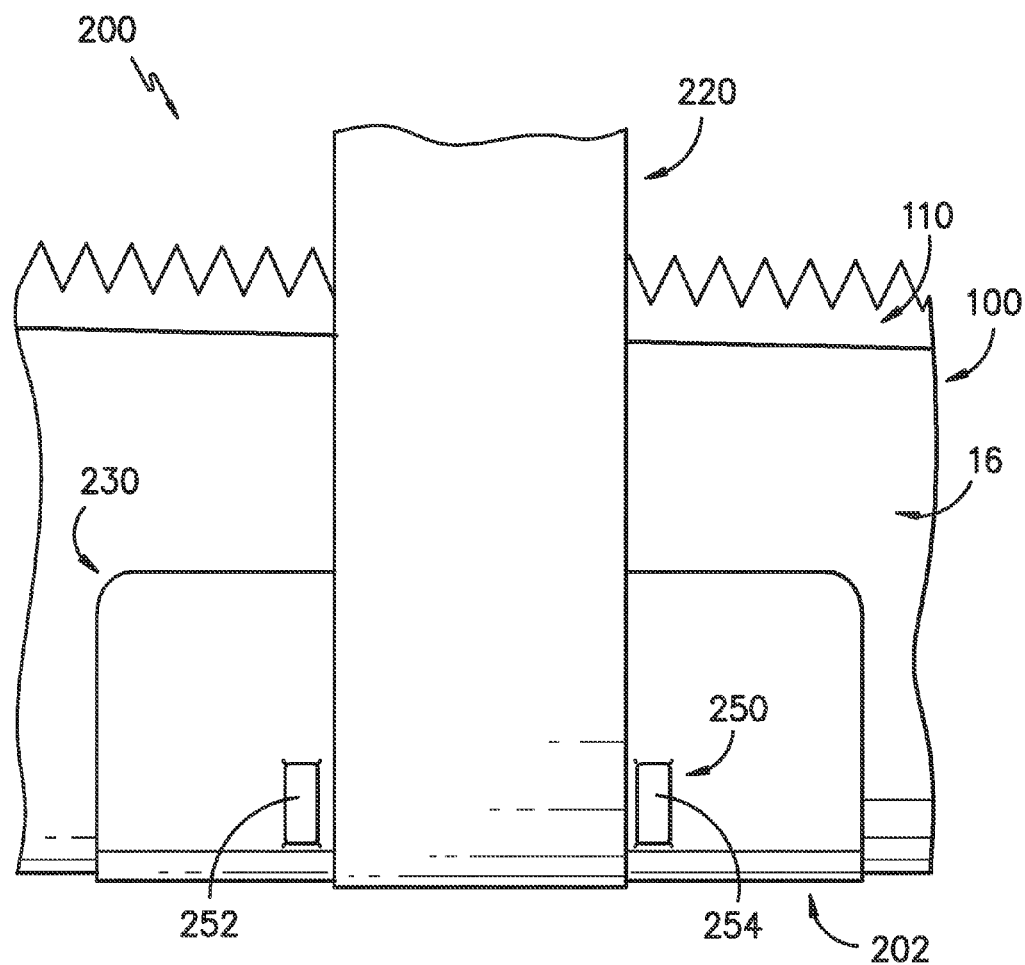
FIG. -7-

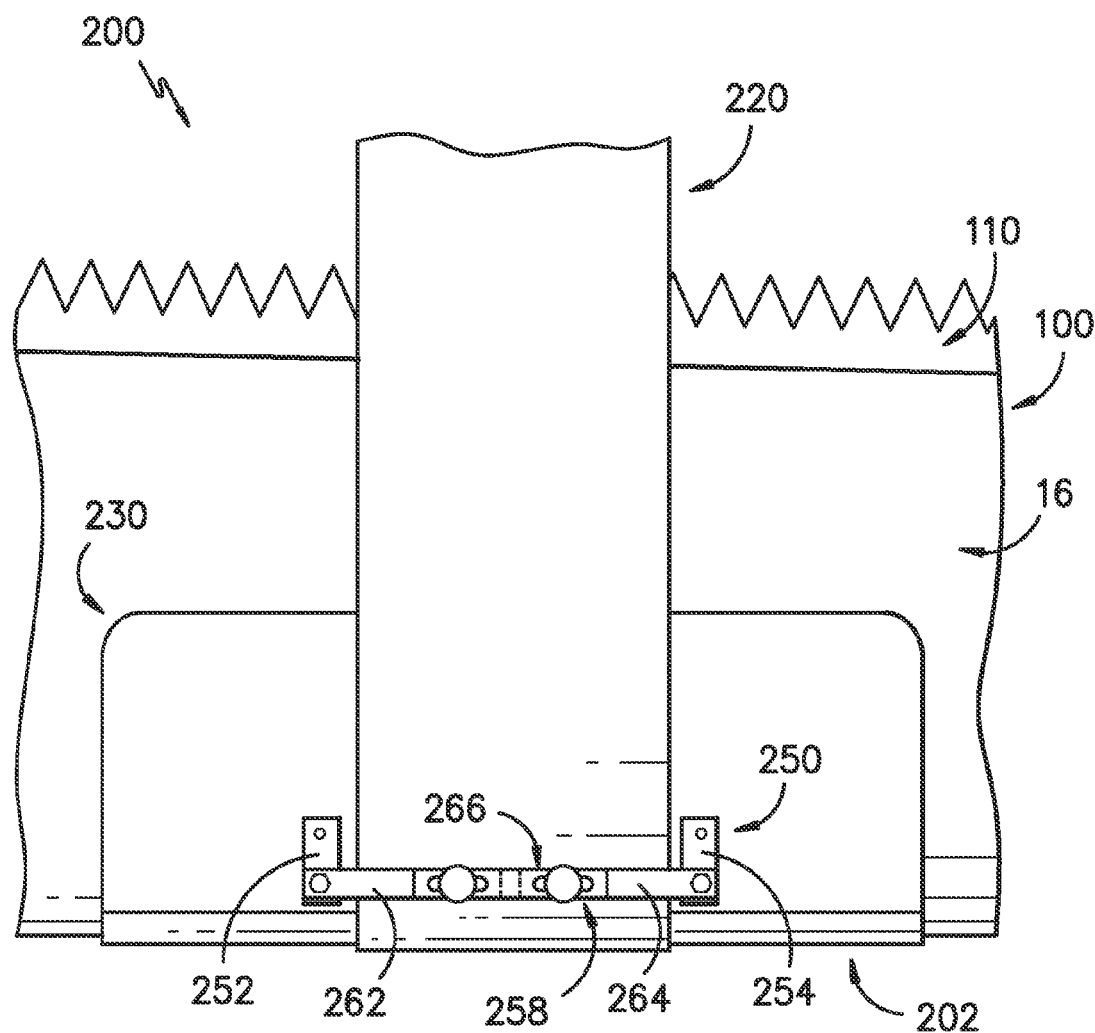
FIG. -8-

TRANSPORTATION ASSEMBLY FOR ROTOR BLADE

FIELD OF THE INVENTION

The present disclosure relates in general to transportation assemblies for rotor blades, such as wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades are typically fabricated and at least partially assembled off-site, and then transported via for example truck, train or ship to a wind turbine site. Protection of the rotor blade and prevention of damage during transportation is critical. Damage that occurs during transportation can cause delays in wind turbine assembly while the damage is repaired, and can cause lingering performance issues for the rotor blade.

Typically, a rotor blade is supported in one or more frames for transport. In some frames, the rotor blade is supported by a sling that is connected to the frame. Further, to prevent damage to the rotor blade by the sling or by other factors, protection caps are utilized. With many typical rotor blades, a leading edge protection cap is situated between a portion of the rotor blade leading edge and the sling, and a trailing edge protection cap is provided on a portion of the trailing edge. The leading edge protection cap and trailing edge protection cap are strapped together, to prevent relative movement of either protection cap during transportation.

Recently, however, the introduction of noise reducers and other flow modifiers to rotor blades has made the use of trailing edge protection caps more difficult, because the protection caps can damage these components. However, the lack of a trailing edge protection cap during transportation has resulted in the leading edge protection cap being free to move. Such movement can cause the leading edge protection cap to move from between the sling and the rotor blade, thus causing direct contact and potential damage to the rotor blade.

Accordingly, improved transportations assemblies are desired. In particular, transportation assemblies which reduce or prevent excess movement of protection caps, and which can be utilized with rotor blades having flow modifiers, would be advantageous.

BRIEF DESCRIPTION OF THE INVENTION

Aspects and advantages of the invention will be set forth in part in the following description, or may be obvious from the description, or may be learned through practice of the invention.

In one embodiment, a transportation assembly for a rotor blade is provided. The transportation assembly includes a protection cap including a nose portion and a plurality of sidewall portions extending from the nose portion, the protection cap having a generally U-shaped cross-sectional profile. The transportation assembly further includes a restraint assembly including a first protrusion and a second protrusion each extending from the protection cap, the first protrusion and the second protrusion spaced apart along a width of the protection cap.

In another embodiment, a transportation assembly is provided for a rotor blade having exterior surfaces defining a pressure side, a suction side, a leading edge and a trailing edge each extending between a tip and a root, the rotor blade defining a span and a chord. The transportation assembly includes a protection cap including a nose portion and a plurality of sidewall portions extending from the nose portion, the protection cap having a generally U-shaped cross-sectional profile. The transportation assembly further includes a restraint assembly including a first protrusion and a second protrusion each extending from the protection cap, the first protrusion and the second protrusion spaced apart along a width of the protection cap. The transportation assembly further includes a sling generally surrounding the protection cap and disposed between the first protrusion and the second protrusion, and a frame generally surrounding the protection cap and the sling, wherein the sling is mounted to the frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a planform view of one embodiment of a rotor blade assembly of the present disclosure;

FIG. 3 is a perspective view of a transportation system in accordance with one embodiment of the present disclosure;

FIG. 4 is a perspective view of a transportation assembly in accordance with one embodiment of the present disclosure;

FIG. 5 is a front cross-sectional view of a transportation assembly in accordance with one embodiment of the present disclosure;

FIG. 6 is a side view of a transportation assembly in accordance with one embodiment of the present disclosure;

FIG. 7 is a side view of a transportation assembly in accordance with another embodiment of the present disclosure; and FIG. 8 is a side view of a transportation assembly in accordance with another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 and 3, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44. A reference local chord line may be drawn along a local chord 46.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

Rotor blade 16 may be a component of a rotor blade assembly 100. A rotor blade assembly 100 according to the present disclosure includes a rotor blade 16 and one or more flow modification devices. Flow modification devices generally modify the air flow over the rotor blade 16 during operation of the wind turbine 10, thus providing various improved flow characteristics to the rotor blade 16. In exemplary embodiments, a flow modification device may be a noise reducer 110. In alternative embodiments, a flow modification device may be a vortex generator, riblet assembly, active flow device, circulation control device, or other suitable device. Flow modification devices are generally configured on an exterior surface of the rotor blade 16 to provide such various flow modification functions.

In general, a flow modification device, such as a noise reducer 110, etc., may be configured on an exterior surface of the rotor blade 16. Noise reducers 110 may reduce the aerodynamic noise being emitted from the rotor blade 16 during operation of the wind turbine 10 and/or increase the efficiency of the rotor blade 16. In an exemplary embodiment of the present disclosure, a flow modification device may be configured on a surface of the rotor blade 16 adjacent the trailing edge 28 of the rotor blade 16. Alternatively, a flow modification device may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIG. 2, a flow modification device, such as a noise reducer 110, etc., may be configured on, such as mounted to, the pressure side 22 of the rotor blade 16. In alternative embodiments, a flow modification device may be configured on, such as mounted to, the suction side 24. As discussed and as illustrated, a flow modification device may in exemplary embodiments be configured on an exterior surface of the rotor blade 16, such as adjacent the trailing edge 28 of the rotor blade 16. Further, in exemplary embodiments as illustrated, a flow modification device may extend in the chord-wise direction beyond the trailing edge 28, such that a portion of the flow modification device is cantilevered from the rotor blade 16.

In yet other alternative embodiments, a flow modification device may be configured on the rotor blade 16 on the trailing edge 28 or the leading edge 26, such as between the pressure side 22 and the suction side 24. The flow modification device may further extend in the chord-wise direction beyond, for example, the trailing edge 28 or leading edge 26. For example, a flow modification device may be configured on the trailing edge 28 between the pressure side 22 and the suction side 24. In some of these embodiments, the rotor blade 16 may be formed from one or more shell portions. For example, one shell portion may include the pressure side 22 and extend between the leading edge 26 and the trailing edge 28, while another shell portion may include the suction side 24 and extend between the leading edge 26 and the trailing edge 28. The flow modification device may be mounted between these shell portions such that a portion of the flow modification device is disposed in the interior of the rotor blade 16, while another portion extends from the rotor blade 16. Alternatively, the flow modification device may extend through a shell portion of the rotor blade 16 at a desired location, such as at the trailing edge 28. In further alternative embodiments, the flow modification device may be mounted directly to the exterior of the rotor blade 16 between the pressure side 22 and the suction side 24 through the use of, for example, a suitable adhesive or suitable mechanical fasteners. For example, in exemplary embodiments, the flow modification device may be mounted directly to the trailing edge 28. In still further exemplary embodiments, the flow modification device may be integral with the rotor blade 16, such that they are formed together from the same materials.

A flow modification device according to the present disclosure includes one or more flow modification features. Each flow modification feature is a component of the flow modification device that performs a desired flow modification function. For example, as discussed, in exemplary embodiments, a flow modification device according to the present disclosure is a noise reducer 110. The noise reducer 110 includes a plurality of noise reduction features. In exemplary embodiments, the noise reduction features are serrations 112. In alternative embodiments, however, the noise reduction features may be bristles, brushes, rods, tufts, or other suitable features adapted to provide noise reduction characteristics.

In some embodiments when the flow modification device is a noise reducer 110, the noise reduction features, such as the serrations 112, etc., may extend from a base plate 114. In these embodiments, the base plate 114 may generally be that portion of the noise reducer 110 that is mounted to the rotor blade 16 to configure the noise reducer 110 on a surface of the rotor blade 16. Alternatively, the noise reduction features may be mounted directly to the rotor blade 16, or may be an integral part of the rotor blade 16. For example, in embodiments wherein the noise reducer 110 is configured on the trailing edge 28, the trailing edge 28 may simply include the plurality of noise reduction features extending therefrom, and the noise reduction features may be integral with the trailing edge 28.

The noise reducer 110 may, in some embodiments, be formed from a plurality of noise reducer sections. Each section may include one or more the noise reduction features, and each section may further include a base plate portion. Alternatively, the noise reducer 110 may be a singular, unitary component.

In exemplary embodiments, one or more flow modification devices may be located within the outboard area 54 of the rotor blade 12. Additionally or alternatively, however, one or more flow modification devices may be located within the inboard area 52.

Referring now to FIG. 3, one embodiment of a transportation system 200 for transporting a rotor blade 16 is illustrated. Transportation system 200 may generally include a transportation assembly 202 and a rotor blade 16. The transportation assembly 202 may be utilized to support the rotor blade 16 for transport. Notably, the rotor blade 16 may be a fully assembled rotor blade, or may be a partial rotor blade 16, such as including one or more rotor blade segments.

The transportation assembly 202 may include a frame 210, which may be supported on a bed 212. The bed 212 may be, for example, a ship bed, truck bed, train car bed, or other suitable surface to be transported using any suitable transportation means. Frame 210 may, for example, be mounted to the bed 212, and may support the rotor blade 16. Frame 210 as illustrated includes a base 214 and two sides 216, each of the base 214 and sides 216 formed from one or more structural members. The sides 216 may be spaced apart by the base 214. Rotor blade 16 may be positioned within the frame 210 such that the frame 210 generally surrounds the portion of the rotor blade 16 being supported.

As illustrated, transportation assembly 202 may further include a sling 220. The sling 220 may be positioned within the frame 210 and generally surrounded by the frame 210. Further, the sling 220 may be mounted to the frame 210, such as to the sides 216 as illustrated. The rotor blade 16 may be positioned such that a portion thereof is supported by the sling 220 in the frame 210 for transport.

Referring now to FIG. 3 as well as FIGS. 4 through 8, transportation assembly 202 further includes a protection cap 230. The protection cap 230 serves to generally protect a portion of the rotor blade 16 during transport, and may for example be positioned between the rotor blade 16 and the sling 220 when the rotor blade 16 is supported by the sling 220, such that sling 220 generally surrounds the protection cap 230 and the frame 210 generally surrounds the sling 220 and protection cap 230. Protection cap 230 may include a nose portion 232 and a plurality of sidewall portions 234 (such as two sidewall portions 234 as illustrated) extending from the nose portion 232. Accordingly, protection cap 230 may have a generally U-shaped cross-sectional profile, as illustrated in FIG. 5.

When transportation assembly 202 is supporting the rotor blade 16, a portion of the rotor blade 16 may contact the protection cap 230, which may be positioned between the rotor blade 16 and the sling 220 for example. In exemplary embodiments, the protection cap 230 is a leading edge protection cap. Accordingly, the leading edge 26 of the rotor blade 16 may contact the nose portion 232 of the protection cap 230 when transportation assembly 202 is supporting the rotor blade 16. Further, in exemplary embodiments, the transportation assembly 202, such as the protection cap 230 thereof, may contact the rotor blade 16 within the outboard area 54 thereof. As discussed, in some embodiments rotor blade 16 may have one or more flow modification devices configured thereon. One or more of these devices may be configured in the outboard area 54. However, as discussed herein, the transportation system 200 and assembly 202 advantageously facilitate the transport of such rotor blades 16 without the need for a trailing edge protection cap, and without concern regarding movement of the protection cap 230.

In exemplary embodiments, the nose portion 232 and sidewall portions 234 are integral, although in alternative embodiments the sidewall portions 234 could be separate from and mounted to the nose portion 232. For example, in exemplary embodiments, the protection cap 230, such as the nose portion 232 and sidewall portions 234 thereof, is formed from and thus includes a fiberglass laminate. The fiberglass laminate can have a plurality of layers which are built up on each other to form the protection cap 230.

In some embodiments, protection cap 230 may further include a reinforcement portion 238. The reinforcement portion 238 may extend from the nose portion 232 to reinforce the nose portion 232, as illustrated. Reinforcement portion 238 may be integral with or mounted to the nose portion 232. For example, in exemplary embodiments, the reinforcement portion 238 may be formed from and thus include a fiberglass laminate. The fiberglass laminate can have a plurality of layers which are built up on each other to form the reinforcement portion 238. Accordingly, as illustrated, a total thickness of the nose portion 232 and reinforcement portion 238 may be greater than a thickness of each sidewall portion 234.

As further illustrated in FIGS. 3 through 8, transportation assembly 202 may further include one or more restraint assemblies 250. Each restraint assembly 250 may generally prevent excess movement of the protection cap 230 during, for example, transportation of a rotor blade 16. In particular, each restraint assembly 250 may generally serve to capture the sling 220 when the protection cap 230 and sling 220 are positioned for supporting a rotor blade 16, thus restricting relative movement of the protection cap 230 and the sling 220. Accordingly, this prevents the protection cap 230 from moving from between the sling 220 and the rotor blade 16 during transport, thus preventing the risk of resulting damage to the rotor blade 16.

A restraint assembly 250 may include a first protrusion 252 and a second protrusion 254. The first and second protrusions 252, 254 may each extend from the protection cap 230. In exemplary embodiments, the first and second protrusions 252, 254 may each extend from one of the plurality of sidewall portions 234, as illustrated. For example, two restraint assemblies 250 may be utilized, each having first and second protrusions 252, 254 extending from opposing sidewall portions 234. Additionally or alternatively, the first and second protrusions 252, 254 of a restraint assembly 250 may extend from the nose portion 232, or from any other suitable locations on the protection cap 230.

The first and second protrusions 252, 254 may further be spaced apart, such as along a width 256 of the protection cap 230. Protrusions 252, 254 may serve to restrict relative movement of the sling 220 and protection cap 230 by capturing the sling 220 therebetween when the protection cap 230 and sling 220 are positioned for supporting a rotor blade 16. Thus, the sling 220 may be disposed between the first and second protrusion 252, 254. Accordingly, relative movement of the sling 220 and protection cap 230 is limited in the direction along the width 256, because the sling 220 may contact the first and second protrusion 252, 254, which may limit any further movement of the sling 220 beyond the first and second protrusion 252, 254.

In some embodiments, as illustrated in FIG. 7, the first and second protrusions 252, 254 may be integral with the protection cap 230. For example, the first and second protrusions 252, 254 may be formed from a fiberglass laminate, and may for example be built-up portions of the protection cap 230.

In other embodiments, as illustrated in FIGS. 3-6 and 8, the first and second protrusions 252, 254 may be separate components from the protection cap 230, and may be mounted to the protection cap 230. Mounting may be performed using any suitable mechanical device and/or technique. For example, suitable mechanical devices, such as nut/bolt combinations, screws, nails, rivets, etc., may be utilized. Additionally or alternatively, a suitable adhesive may be utilized. Still further, welding, brazing or other suitable mounting techniques may be utilized.

In exemplary embodiments, the first and second protrusions 252, 254 may be C-channels, as illustrated. C-channels are members, typically formed from a suitable metal or metal alloy, that generally have C-shaped cross-sectional profiles. Alternatively, U-channels, I-channels, or other suitable members (hollow, solid or otherwise) may be utilized as first and second protrusions 252, 254. The first and second protrusions 252, 254 may have the same shape, cross-sectional profile, etc., or may be different.

Referring still to FIGS. 3-6 and 8, in some embodiments, restraint assembly 250 further includes a cross-bar 258. The cross-bar 258 extends between the first protrusion 252 and the second protrusion 254, and is spaced from the protection cap 230 as illustrated. The cross-bar 258 serves to further capture the sling 220 and prevent relative movement of the sling 220 and protection cap 230. When the sling 220 and protection cap 230 are positioned for supporting a rotor blade 16, the sling 220 may be disposed between the protection cap 230 and the cross-bar 258, as illustrated. Advantageously, the sling 220 thus is prevented from moving away from the protection cap 230 a sufficient distance to be past the protrusions 252, 254. The protrusions 252, 254 and cross-bar 258 may thus work together to restrict the relative movement of the sling 220 and protection cap 230.

In some embodiments, as illustrated for example in FIGS. 3 through 6, the cross-bar 258 may be a single component mounted to the first protrusion 252 and the second protrusion 254. In other embodiments, as illustrated in FIG. 8, the cross-bar 258 may include various individual portions. For example, the cross-bar 258 may include a first portion 262 mounted to the first protrusion 252, and a second portion 264 mounted to the second protrusion 254. As illustrated in some embodiments, the first portion 262 and second portion 264 may extend towards each other, but not be long enough to contact each other. Accordingly, a gap may exist between the first portion 262 and second portion 264. A third portion 266 of the cross-bar 258 may thus be provided, and may be removably connectable to the first portion 262 and the second portion 264. The third portion 266 may extend across and cover the gap. In exemplary embodiments, a suitable removable mechanical fastener, such as a screw or nut/bolt combination, may be utilized to removably connect the third portion 266 to the first portion 262 and the second portion 264. The third portion 266 can be removed to, for example, allow the sling 220 through the gap in either direction as desired, and can be connected to capture the sling 220 as discussed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A transportation assembly for a rotor blade, the transportation system comprising:
   a protection cap comprising a nose portion and a plurality of sidewall portions extending from the nose portion, the protection cap having a generally U-shaped cross-sectional profile;
   a restraint assembly comprising a first protrusion and a second protrusion each extending from the protection cap, the first protrusion and the second protrusion spaced apart along a width of the protection cap; and
   a sling generally surrounding the protection cap and disposed between the first protrusion and the second protrusion,
   wherein a leading edge of the rotor blade contacts the nose portion of the protection cap.

2. The transportation assembly of claim 1, wherein the first protrusion and the second protrusion are integral with the protection cap.

3. The transportation assembly of claim 1, wherein the first protrusion and the second protrusion are separate components from and mounted to the protection cap.

4. The transportation assembly of claim 1, wherein the first protrusion and the second protrusion are C-channels.

5. The transportation assembly of claim 1, wherein the restraint assembly further comprises a cross-bar extending between the first protrusion and the second protrusion, the cross-bar spaced from the protection cap.

6. The transportation assembly of claim 5, wherein the cross-bar is a single component mounted to the first protrusion and the second protrusion.

7. The transportation assembly of claim 5, wherein the cross-bar comprises a first portion mounted to the first protrusion, a second portion mounted to the second protrusion, and a third portion removably connectable to the first portion and the second portion.

8. The transportation assembly of claim 1, wherein the protection cap comprises a fiberglass laminate.

9. The transportation assembly of claim 1, wherein the protection cap further comprises a reinforcement portion extending from the nose portion, the reinforcement portion comprising a fiberglass laminate.

10. The transportation assembly of claim 1, wherein the first protrusion and the second protrusion each extend from one of the plurality of sidewall portions.

11. The transportation assembly of claim 1, wherein the restraint assembly is a plurality of restraint assemblies.

12. The transportation assembly of claim 1, wherein the restraint assembly further comprises a cross-bar extending between the first protrusion and the second protrusion, the cross-bar spaced from the protection cap, and wherein the sling is further disposed between the protection cap and the cross-bar.

13. A transportation assembly for a rotor blade having exterior surfaces defining a pressure side, a suction side, a leading edge and a trailing edge each extending between a tip and a root, the rotor blade defining a span and a chord, the transportation assembly comprising:

a protection cap comprising a nose portion and a plurality of sidewall portions extending from the nose portion, the protection cap having a generally U-shaped cross-sectional profile;

a restraint assembly comprising a first protrusion and a second protrusion each extending from the protection cap, the first protrusion and the second protrusion spaced apart along a width of the protection cap;

a sling generally surrounding the protection cap and disposed between the first protrusion and the second protrusion; and a frame generally surrounding the protection cap and the sling, wherein the sling is mounted to the frame;

wherein the leading edge of the rotor blade contacts the nose portion of the protection cap.

14. The transportation assembly of claim 13, wherein a flow modification device is configured on an exterior surface of the rotor blade within an outboard area of the rotor blade and extends in a chord-wise direction beyond the trailing edge, and wherein the transportation assembly contacts the rotor blade within the outboard area.

* * * * *